Aug. 30, 1960  C. B. WARSHAWSKY  2,950,663
AERIAL CAMERA
Filed Jan. 28, 1957  5 Sheets-Sheet 1
FIG. 1
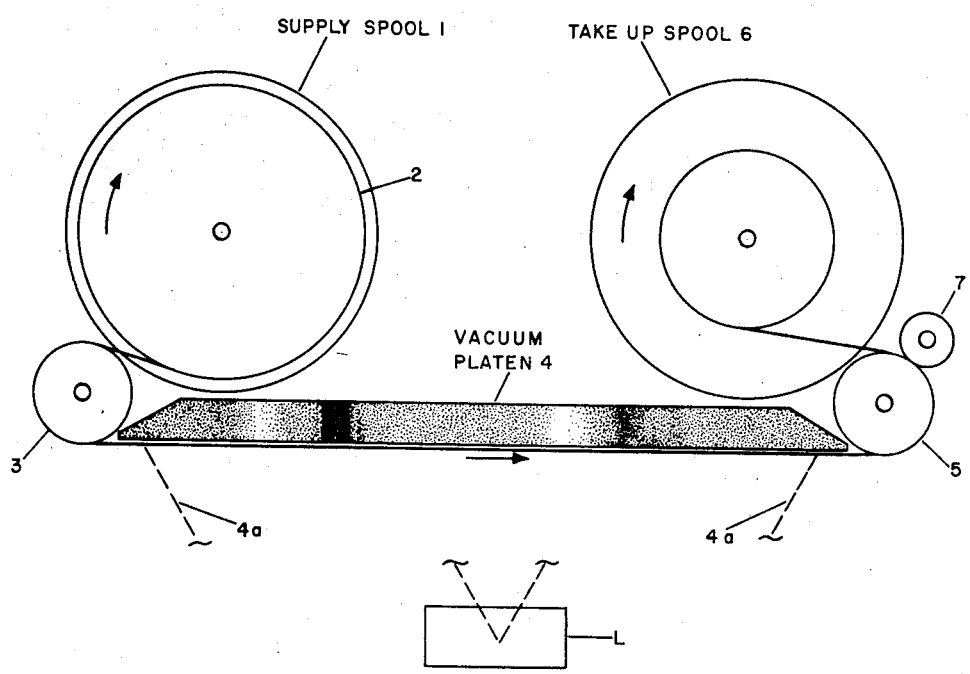
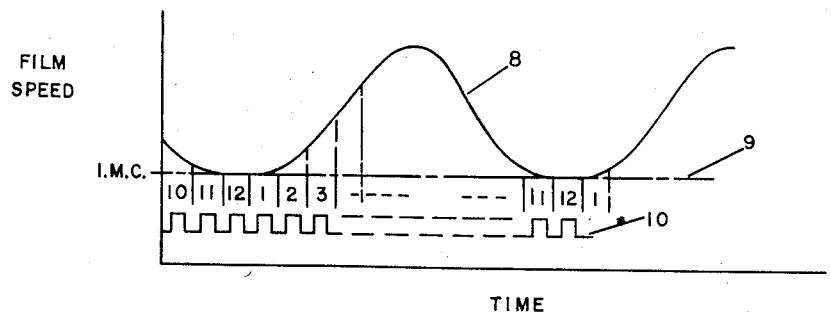
FIG. 2
Curtis B. Warshawsky
INVENTOR
BY
ATTORNEY Aug. 30, 1960 C. B. WARSHAWSKY 2,950,663
AERIAL CAMERA
Filed Jan. 28, 1957 5 Sheets-Sheet 3

Curtis B. Warshawsky
INVENTOR

BY

ATTORNEY

Curtis B. Warshawsky
INVENTOR

ATTORNEY

Aug. 30, 1960  C. B. WARSHAWSKY  2,950,663
AERIAL CAMERA
Filed Jan. 28, 1957  5 Sheets-Sheet 5

Curtis B. Warshawsky
INVENTOR

BY

ATTORNEY

United States Patent Office 2,950,663
Patented Aug. 30, 1960

2,950,663

AERIAL CAMERA

Curtis B. Warshawsky, Pacific Palisades, Calif., assignor to Hycon Mfg. Company, Pasadena, Calif., a corporation of Delaware Filed Jan. 28, 1957, Ser. No. 636,771

13 Claims. (Cl. 95—12.5)

This invention relates generally to aerial cameras and more particularly to an aerial camera incorporating image motion compensation.

In aerial mapping, reconnaissance and surveillance, an aircraft mounting an aerial camera is flown over the area to be surveyed and photographs are taken to cover the entire area. The aircraft is normally flown at some constant altitude and overlapping photographs are taken along the flight path of the terrain viewed by the camera lens system. The camera is operated continuously, and consecutive pictures, one after another, are usually made with the camera to provide a strip of photographs.

Photographs obtained by a camera not utilizing image motion compensation would cause blurring of the photographs because of the relative motion between the aircraft mounting the camera and the ground, which produces movement of the image across the focal plane. This blurring can be greatly reduced by moving the film in the direction of flight at a velocity effectively equal to the rate of image movement on the focal plane of the camera, to compensate for image motion. The degree of blurring is directly proportional to the length of exposure time and velocity of the aircraft, and inversely proportional to the aircraft altitude. Rigorously, the effect of variations in the aperture size during the shutter operation cycle should also be considered, but this effect is generally minor.

Image motion compensation (IMC) is principally required in aerial photography to prevent a significant loss of resolution in photographic details. A light aircraft flying at 200 m.p.h., for example, may normally fly at any selected altitude from approximately 600 to 1500 feet to obtain necessary information of the terrain below. The higher the altitude at which the aircraft operates, the less is the need for image motion compensation. If the aircraft is flown only at, say, three specific altitudes on surveys, three different rates of image motion compensation only are required for suitable control. These altitudes may, for example, be at 600, 1000 and 1500 feet, which would cover the normal operating altitude range adequately. Small departures of the aircraft from the selected altitude for which image motion compensation is provided would not produce discernible errors, particularly since a higher altitude results in less image motion (a normally sharper appearing photograph) to compensate for the slightly higher than required image motion compensation rate, and a lower altitude resulting in greater image motion that is somewhat under corrected, is compensated by the larger scale of the photograph.

A sequence of photographs may be suitable for stereoscopic viewing if successive photographs provide sufficient overlap of the areas viewed. A 60% overlap of adjacent pictures in a strip of photographs will provide satisfactory stereoscopic views.

It is an object of this invention to provide an aerial camera incorporating a novel film drive mechanism capable of positioning film between exposures and supplying correct image motion compensation during the taking of photographs.

Another object of the invention is to provide means for synchronizing film movement with shutter operation to permit film exposure only at a correct image motion compensation rate.

Another object of the invention is to provide a film drive mechanism having a smooth speed curve with no discontinuities or abrupt changes, i.e., large accelerations, requiring large demands for power.

A further object of this invention is to provide a lightweight aerial camera having a simple and reliable yet versatile film drive mechanism.

Briefly, the foregoing and other objects are preferably accomplished by providing an aerial camera in which film can be driven continuously. A gear cluster transmission can be provided for changing IMC speed, which is the selected minimum speed that the film is driven for image motion compensation during exposure. A three gear, eccentric link mechanism connects the selected output of the gear cluster to a metering roller which actually drives the film. The gear-link mechanism imparts a continually varying speed to the metering roller such that fresh film is pulled into the format at increased speeds each cycle between minimum (IMC) speeds, the shutter being operated during the minimum speeds. An electrical interlock circuit is provided to keep the shutter mechanism in phase with the magazine film movement mechanism so that the shutter is only operated at correct IMC speeds, after fresh film has been drawn into the format.

Other features and objects will be apparent from the following detailed description of a preferred embodiment of the invention, reference being made to the attached drawings, in which:

Figure 1 is a film threading diagram through the general transport system of the invention;

Figure 2 is a graph illustrating a plot of film speed versus time for the invention;

Figure 3:
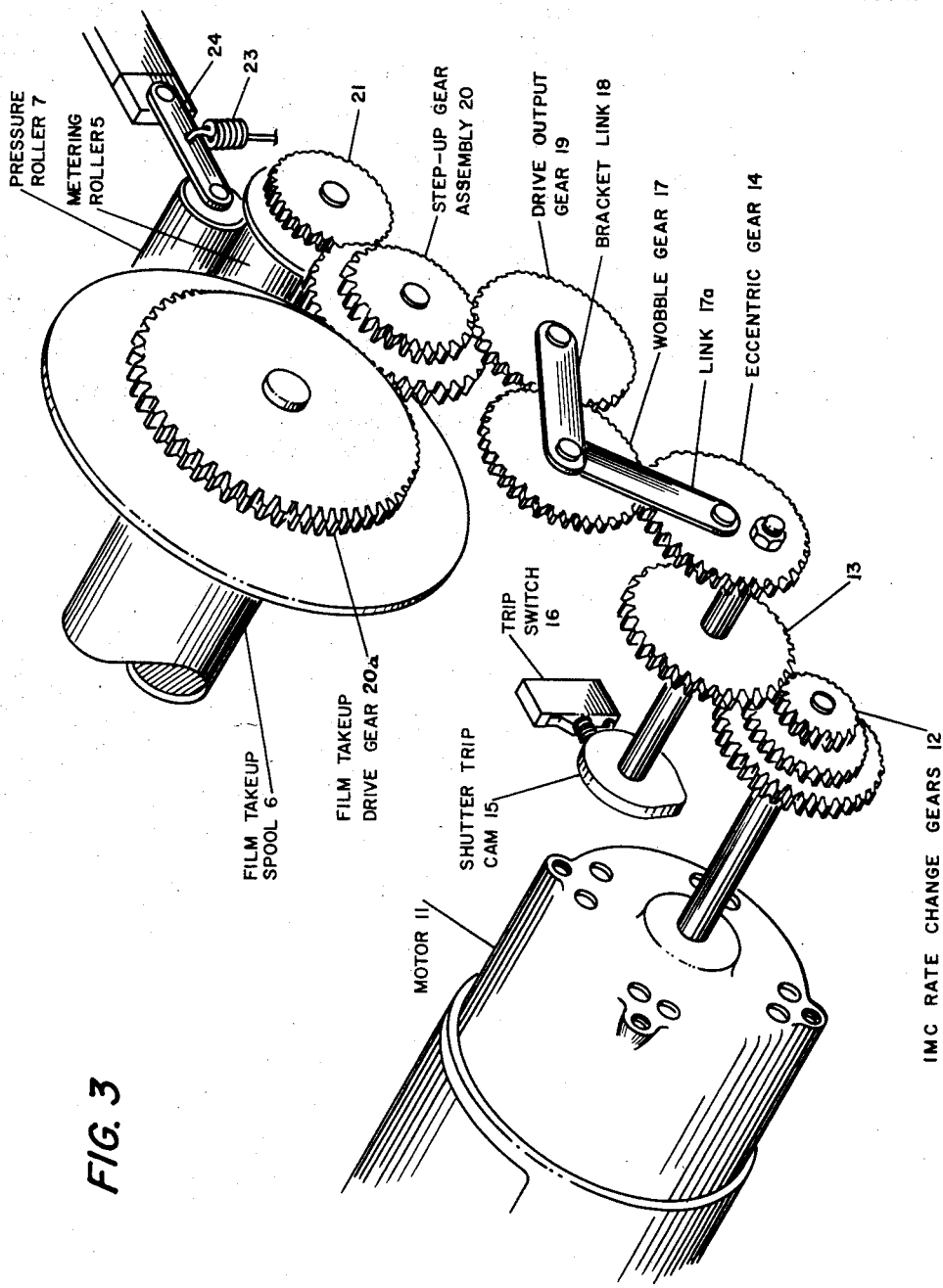
Figure 3 is a mechanical schematic of the film drive mechanism.

A diagrammatic drawing of a film transport system is shown in Figure 1. All of the film transport elements shown in this figure (not including lens system L) are contained in the magazine of an aerial camera. The system is generally conventional, having a supply spool 1 carrying a roll of unexposed film 2 which is drawn off the spool 1 and threaded around guide roller 3, led past the face of vacuum platen 4, around metering roller 5 and wound onto film takeup spool 6. A pressure roller 7 presses the film 2 against metering roller 5 which actually drives the film 2.

The supply spool 1 is supported for free rotation; however, a conventional light friction brake (not shown) is attached to one end of spool 1 to prevent unrestrained unraveling of the film 2. The film 2 is drawn flat against the face of vacuum platen 4 of conventional type which produces a low vacuum that does not interfere with movement of the film 2 across the face of the platen 4. The image is formed by the lens system L (which includes a between-the-lens shutter described later) on the film as indicated by the broken lines 4a diverging from the lens system. The takeup spool 6 is driven through a conventional slip clutch (not shown) to wind up the film 2 moved by the metering roller 5. A slip clutch is necessary because the takeup spool 6 must be rotated faster at the beginning than later when the film roll being wound on the spool 6 gradually increases in diameter.

Figure 2 is a graph illustrating the cyclic, sinuous variation of film speed with time that can be produced in an aerial camera according to the present invention. Curve 8 is modified from a strictly sine wave form to provide generally flat troughs which coincide with a film speed level indicated by line 9. This level is labeled IMC and is the image motion compensation rate necessary for an aircraft flying at a constant, predetermined speed and at a particular altitude. Of course, this IMC rate must be increased or reduced for a lower or higher altitude, for the same aircraft speed, but line 9 is only intended to indicate the IMC correction necessary for an aircraft flying at some selected constant speed and constant altitude.

The curve 8 is shown divided into twelve equal sections for each cycle along the time axis, and each section is identified by a number ranging from 1 to 12, the lowermost section, at IMC speed, bearing the numeral 12. A square wave 10 is drawn below the curve 8 such that the pulses fall in the middle of the different sections. These pulses are generated in a manner described later, and are used to cock and trip the camera shutter, the shutter being tripped by the last pulse of the series, occurring during the time interval 12, so that proper synchronization of film speed and shutter operation is obtained. It is noted that the speed curve 8 has no discontinuities or abrupt changes, so there are no large accelerations and hence no suddenly applied loads requiring large demands of power.

A film drive mechanism that can produce the speed curve 8 is shown in schematic Figure 3. Motor 11 drives a cluster of three IMC rate change gears 12 at a constant speed, any one of which can be meshed with a gear 13 to rotate eccentric gear 14 and shutter trip cam 15. Shutter trip cam 15 cooperates with trip switch 16, and actuates it when the raised portion of the cam 15 engages the trip switch 16, this being timed to occur during time interval 12 when the film is being driven at the selected IMC speed. Eccentric gear 14 continually meshes with a wobble gear 17 which rotates on a movable center. The center of eccentric gear 14 is tied to the center of wobble gear 17 by a connecting link 17a. Wobble gear 17 is also constrained by bracket link 18 to mesh with drive output gear 19, which has a fixed axis, link 18 being seen to connect the axes of gears 17 and 19. The radius from the center of rotation of the eccentric gear 14 to the point of tooth contact with wobble gear 17 continually varies and results in a sinusoidal speed-time relationship in wobble gear 17. As wobble gear 17 rotates, it also rolls back and forth about a center of rotation which is the fixed center of output gear 19, this being the result of the eccentric mounting of gear 14. This back and forth motion is added to the sinusoidal motion and the sum of these two motions is expressed in the speed-time relationship of the output gear 19 as illustrated, for example, by the sinuous, flat trough curve 8 of Figure 2. The waveform of curve 8 can be varied radically to meet various conditions by selecting different gear dimensions and eccentricities.

Output gear 19 is meshed with step-up gear assembly 20 which is, in turn, meshed with metering roller drive gear 21. Step-up gear assembly 20 also meshes with film takeup drive gear 20a which drives the film takeup spool 6 through a conventional slip clutch (not shown). A spring 23 connected to pressure roller lever arm 24 forces the pressure roller 7 to bear on metering roller 5. Thus, metering roller 5 and pressure roller 7 principally drive the film 2.

Gear dimensions are selected so that the film 2 is driven at the correct image motion compensation speed during a certain portion of a cycle of operation. This correct IMC speed occurs when the output gear is rotating at a minimum speed, at which time the shutter is operated. The gear dimensions are also selected so that fresh film can be pulled into the format and the film drive mechanism will return to IMC speed for another shutter operation at the correct time to provide successive photographs of sufficient overlap (60%, for example) for stereoscopic viewing. The IMC speed can be changed to three different values provided by the three rate change gears 12 to produce correct IMC speed for three different altitudes of an aircraft flying at a constant speed.

Figure 4:
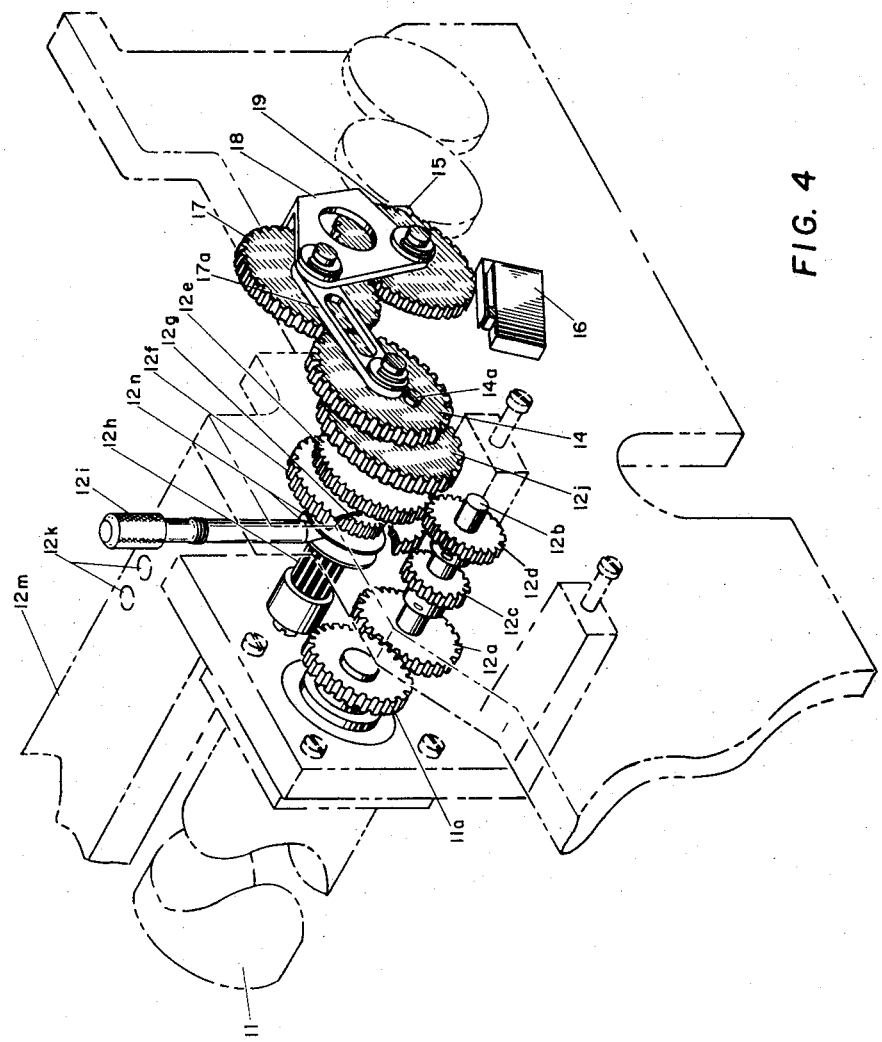
Figure 4 is a fragmentary perspective showing the film drive mechanism in the camera.

Figure 4 shows a perspective view of the actual film drive mechanism, and in particular the eccentric gear, wobble gear and linkage combinations. Motor 11 drives the eccentric gear 14 through an IMC rate gearing transmission assembly comprising several gears. Gear 11a is affixed to the drive shaft of motor 11 and is meshed with gear 12a which is mounted on shaft 12b. Two other gears 12c and 12d are also mounted to the shaft 12b as shown, and rotate with gear 12a. These gears, on shaft 12b, can engage selectively three gears 12e, 12f and 12g respectively, of a gear cluster splined and axially movable (manually) on splined-shaft 12h. Gear 12f is partially broken away to show gear 12g behind it. A pin 12i is used to lock the gear cluster in any selected position on splined shaft 12h, so that only one gear on shaft 12b will mesh with one on splined-shaft 12h to drive gear 12j affixed to the end of splined-shaft 12h at an IMC rate. The pin 12i is screwed into any of three holes 12k in an overlying frame member 12m such that the end of the pin 12i is wedged between two discs 12n, which locks the gear assembly (12e, 12f and 12g) in position.

Gear 12j meshes with another gear (not shown in Figure 4) which drives a 12-segment commutator (also not shown here) employed to produce pulses for cocking the camera shutter as described later. Eccentric gear 14 is rotatably pinned, eccentrically, to the end of splined-shaft 12h, as at 14a, and meshes with wobble gear 17. Wobble gear 17 is held in mesh with eccentric gear 14 at all times by link 17a connecting the centers of gears 14 and 17. A channel-shaped bracket link 18 also connects the center of wobble gear 17 to the center of the fixed-center variable speed output gear 19.

Shutter trip cam 15, mounted behind output gear 19, is rigidly attached to output gear 19, rotating with it to actuate trip switch 16 once each revolution, during its minimum speed phase. Output gear 19 meshes with and drives gears which move the film and turn the takeup spool through a slip clutch, as described before for Figure 3.

Figure 5:
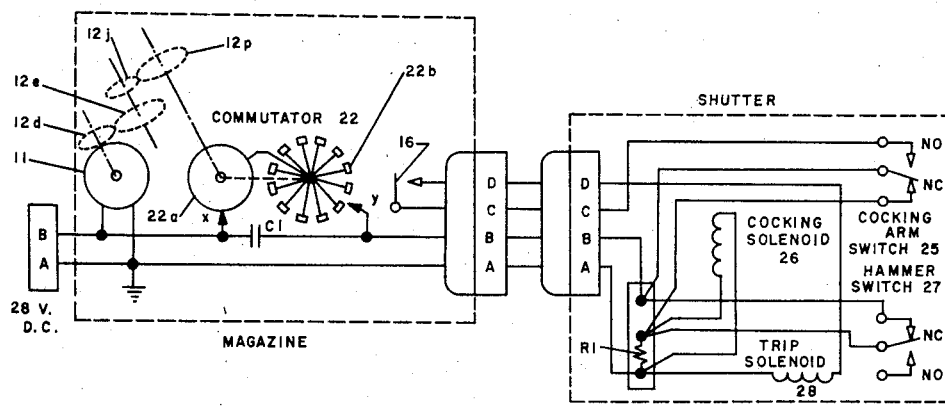
Figure 5 is a wiring diagram for the camera magazine and shutter mechanisms.

The circuitry for cocking the shutter and synchronizing the tripping of the shutter with film speed is shown in Figure 5. The motor 11, through selected transmission gears such as 12d, 12e and gear 12j meshing with a gear 12p, drives the 12-segment commutator 22 at one to one gear ratio with output gear 19. Commutator brushes x and y respectively ride against the periphery of the continuous commutator conducting segment 22a and against the 12-segment conducting wheel 22b. The twelve segments of conducting wheel 22b are electrically connected to the continuous commutator conducting segment 22a. Power, 28 volts D.C., is supplied to energize motor 11 on leads A and B. Lead A is connected to ground, and lead B is periodically broken by the action of the 12-segment commutator 22 such that twelve pulses appear on brush y for each revolution of output gear 19. A capacitor C1 is connected between the brushes x and y to reduce sparking. Trip switch 16 is closed by action of trip cam 15 (Figure 4) during the twelfth section of the cycle (see Figure 2) that the twelfth pulse appears, the film being driven at this time at IMC speed, as heretofore explained.

The pulses produced by each conducting segment of the 12-segment conducting wheel 22b appearing on brush y are applied through the normally closed contacts NC of shutter cocking arm switch 25 to cocking solenoid 26. A damping resistor R1 is connected across the coil of cocking solenoid 26. These pulses can also be applied to the cocking solenoid 26 through the normally closed contacts NC of hammer switch 27. When the cocking arm switch 25 is closed through its normally open contacts NO, a pulse can be transmitted to trip solenoid 28 when trip switch 16 is also closed. This trips the camera shutter for a picture.

Figure 6:
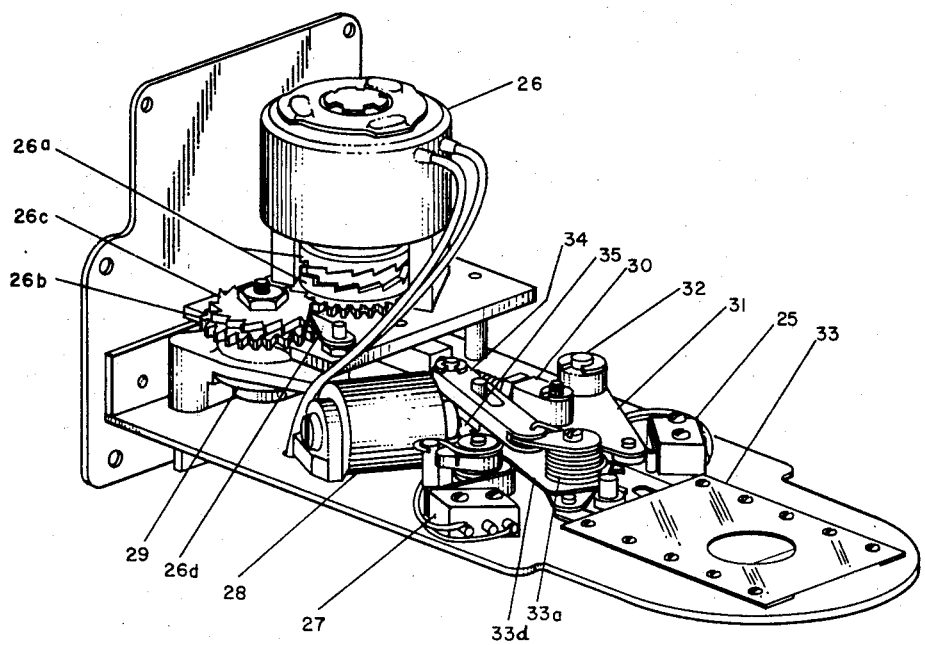
Figure 6 is a perspective illustrating a preferred shutter mechanism.
Figure 7A:
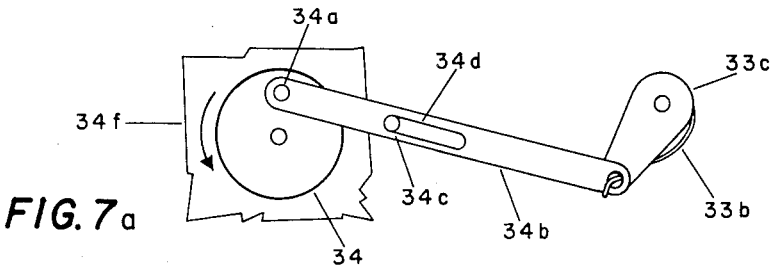
Figures 7a and 7b are diagrammatic views illustrating the mechanism for varying shutter speed.
Figure 7B:
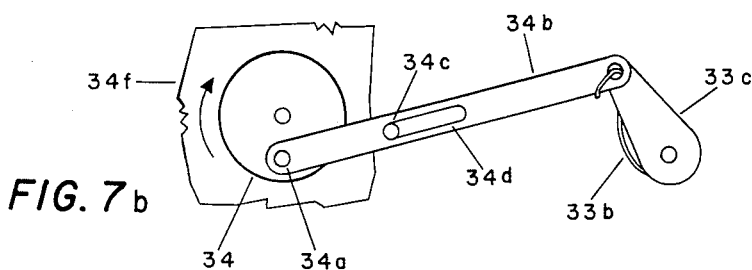
Figure 8:
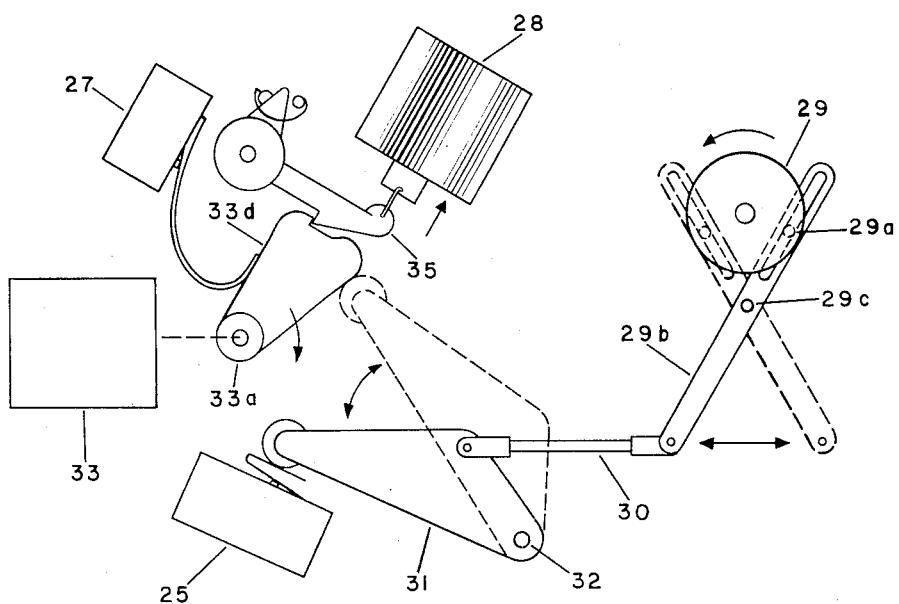
Figure 8 is a diagrammatic drawing for describing the operation of the shutter mechanism.

The structure and physical arrangement of the shutter mechanism is shown in Figures 6, 7 and 8. The cocking solenoid 26 is a Ledex type pulse actuated, step-by-step rotary solenoid having a ratchet wheel output 26a driving, through a suitable gear 26b, a crankdisc 29 (see Figure 8). A ratchet wheel 26c cooperating with pawl stop 26d is affixed integrally to gear 26b to prevent reverse rotation of the gear 26b. The crankdisc 29, located below gear 26b, and attached linkage is more clearly shown in diagrammatic Figure 8. A crankpin 29a affixed to the crankdisc 29 rides in a slot in lever arm 29b which is mounted on pivot axle 29c as shown. As crankdisc 29 is rotated in the direction indicated, the lever arm 29b oscillates back and forth between the position shown and the broken line position indicated.

Connecting rod 30 is pin jointed to the end of lever arm 29b, and is connected to reciprocate cocking arm 31 on its pivot axle 32 in an arc by virtue of the motion of lever arm 29b. Cocking arm 31 is in the form of a triangular plate having a roller bearing surface at the tip thereof. The cocking arm 31 actuates the cocking arm switch 25 in the extreme travel position illustrated in Figures 6 and 8. This position corresponds with a correct pulse reference position; that is, pulse 12 has just appeared, moving the cocking arm 31 against (operating) cocking arm switch 25 (which permits the remainder of pulse 12 to be fed to trip solenoid 28 if trip switch 16 is closed).

The shutter 33 is a conventional drawer (guillotine) type, between-the-lens shutter, not necessary here to illustrate in detail. Shutter 33 includes conventional drawer type shutter actuating spring mechanism 33a which permits cocking of the shutter and subsequent opening and closure of the shutter aperture. Shutter speed can be regulated by adjusting shutter spring tension as shown in Figures 7a and 7b. Two shutter speeds can be obtained as shown respectively in Figure 7a and Figure 7b. The position illustrated in Figure 7a yields a shutter speed of 1/150 second whereas the position illustrated in Figure 7b yields a shutter speed of 1/300 second, for example. The positions are maintained by friction in the system.

The crankwheel 34, which is fitted for rotation with light friction in an aperture in member 34f, can be manually rotated in one direction or the other as indicated by the arrows in Figures 7a and 7b from the positions shown. Crankpin 34a moves lever arm 34b which is guided by fixed pin 34c in slot 34d such that shutter spring 33b tension is increased or decreased by rotation of spring lever arm 33c. Obviously, other intermediate shutter speeds are obtained if the crankwheel 34 is adjusted to various positions between extreme end positions. As shown in Figures 7a and 7b, the shutter spring 33b is attached at one end to the pivot junction of lever arms 34b and 33c. The other end of the coiled shutter spring 33b is fastened to shutter spring mechanism arm 33d (Figure 8). It is to be noted that other springs, conventionally connected, of the shutter actuating spring mechanism 33a have not been detailed since the shutter mechanism can be the well-known type (having a shutter spring mechanism similar to those in common box cameras) which opens and then closes the camera aperture following release of a cocked shutter.

The shutter speed regulating mechanism shown in Figures 7a and 7b has been omitted in diagrammatic Figure 8 because it is not necessary for explanation of shutter operation. The cocking solenoid 26 (Figure 5) moves the cocking arm 31 in discrete steps, a number of pulses being used to cock the shutter to avoid the need of a large power supply, or a sudden drain of power.

The shutter can be cocked in six pulses, or steps, from the pulse reference position where cocking arm switch 25 is actuated. The cocking arm 31, moving clockwise, and bearing against arm 33d, forces the shutter actuating spring mechanism 33a to a cocked position in which the spring mechanism arm 33d is held by latch 35. In this position, hammer switch 27 is also actuated by the spring mechanism arm 33d. The cocking arm 31 requires six more pulses to return it to the pulse reference position whereupon cocking arm switch 25 is actuated. A large portion of the last pulse (twelfth) is also passed through the cocking arm switch 25 in the actuated (NO) condition and is passed to trip solenoid 28 if trip switch 16 is closed at that time, to release spring mechanism arm 33d and operate the shutter 33 through shutter actuating mechanism 33a.

Synchronized camera operation can be described with reference to Figures 5 and 8. Motor 11 runs at a constant speed, driving film through the film drive mechanism shown in Figure 3 or Figure 4, and also drives commutator 22. Trip switch 16 is closed for the last (twelfth) pulse produced by the commutator 22. Assuming that the shutter has just been operated to take a picture, cocking arm switch 25 is still in the normally open NO position, trip switch 16 is just about to open, and hammer switch 27 has just been released to assume the normally closed NC position. Trip switch 16 will be open before the first pulse is produced by commutator 22 and since the cocking arm switch 25 is still in the normally open NO position, the first pulse is only transmitted through the NC contacts of hammer switch 27 to cocking solenoid 26, moving the cocking arm 31 one discrete step forward from pulse reference position.

Movement of cocking arm 31 permits the cocking arm switch 25 to assume the normally closed NC position, and the next five pulses are transmitted to the cocking solenoid 26 through both cocking arm switch 25 and hammer switch 27 in the NC positions. The hammer switch 27, however, is opened during the sixth pulse when the shutter is fully cocked, and the next six pulses are applied through the cocking arm switch 25 alone to the cocking solenoid 26. Of course, fresh film is being drawn into the format during this time at a rate according to the curve 8 of Figure 2. Trip switch 16 is closed by trip cam 15 (Figure 4) during the twelfth time section of curve 8, when the twelfth pulse is produced.

The twelfth pulse brings the cocking arm 31 back in contact with cocking arm switch 25, operating it quickly to assume a NO contact condition, such that a good part of the last pulse is transmitted to trip solenoid 28, releasing the spring mechanism arm 33d to operate shutter actuating mechanism 33a for an exposure. This also permits hammer switch 27 to assume the normally closed NC position, repeating the cycle. The shutter is tripped in the flat region of the minimum value of the film speed curve which coincides with the correct IMC (line 9) speed.

It is clear that the shutter must not be tripped until the shutter cocking cycle is in phase with the film movement cycle for proper operation. Assume that the camera is started with the cocking arm 31 leading, in position, relative to commutator reference pulse position; that is, the cocking arm 31 is leading in phase for the existing film speed condition determined by the film drive mechanism. Hammer switch 27 is closed and cocking arm switch 25 is in the normally closed NC position. The shutter is cocked and hammer switch 27 opened in less than the usual six pulses, and cocking arm 31 returns to actuate cocking arm switch 25 to the NO position in less than twelve pulses. Thus, the remaining pulses produced by the phase-lagging commutator cannot be transmitted to cocking solenoid 26 either through the cocking arm switch 25 or the hammer switch 27. The result is that the cocking arm 31 does not move, and will wait until the last (twelfth) pulse appears when trip switch 16 is closed, to permit operation of trip solenoid 28, which action closes hammer switch 27. The camera is then in phase, and continues to operate in the normal manner.

If the camera is started with the cocking arm 31 lagging in position relative to commutator reference pulse position, the shutter is not cocked, hammer switch 27 is closed and cocking arm switch 25 is in the normally closed NC position. When the lagging arm 31 operates cocking arm switch 25 to the NO position, trip switch 16 will not be closed to feed a pulse to trip solenoid 28. The pulse is, however, fed through closed hammer switch 27 to the cocking solenoid 26, moving the cocking arm 31. More than the usual six pulses are required to cock the shutter and open hammer switch 27, and cocking arm 31 returns to actuate cocking arm switch 25 to the NO position in more than twelve pulses. When both hammer switch 27 and cocking arm switch 25 are in the NO positions, the cocking arm 31 stops and waits until the phase-leading commutator again produces the last (twelfth) pulse when trip switch 16 is closed, permitting operation of trip solenoid 28 in the usual manner. The camera then operates normally and in phase.

While only gearing providing IMC rates for three selected altitudes and at a constant flying speed are shown, the gearing can be easily adapted to be automatically responsive to altitude, such as by having a variable speed transmission, governed by the output of an altimeter, driving the output gear 19. Similarly, varying flying speed can be adapted to control IMC rate, and both flying speed and altitude factors may be mixed by conventional and well-known means, including standard servo circuits to provide suitable control of IMC rate.

It is to be understood that the particular embodiment of the invention described above and shown in the drawings is merely illustrative of and not restrictive on the broad invention, and that various changes in design, structure and arangement may be made without departing from the spirit and scope of the broader of the appended claims.

What is claimed is:

1. For use in a camera incorporating image motion compensation film drive mechanism, an eccentric gear adapted to be driven at image motion compensation rate; a wobble gear engaging with said eccentric gear; an output gear; means for constraining said wobble gear in floating engagement with both said eccentric gear and said output gear, whereby a sinuous output speed curve can be generated by said output gear and means for imparting the output of said output gear to film in a camera to control film movement.

2. In combination with a camera incorporating image motion compensation, a substantially constant speed motor; a transmission for providing a plurality of different output speeds corresponding respectively to correct image motion compensation rates for different image motion condition, said transmission being driven by said motor; an eccentric gear adapted to be driven by the output of said transmission; a wobble gear engaging with said eccentric gear; an output gear; means for constraining said wobble gear in floating engagement with both said eccentric gear and said output gear, said constraining means comprising connecting links respectively connecting the center of said wobble gear to the centers of said eccentric gear and said output gear, whereby a sinuous output speed curve can be generated by said output gear; and a film drive roller adapted to be driven by said output gear for moving film in the camera according to the sinuous output speed curve.

3. A camera incorporating image motion compensation, comprising means for forming an image on a focal plane; film drive means including an eccentric gear adapted to be driven at image motion compensation rate, a wobble gear engaging with said eccentric gear, an output gear adapted to drive film in the focal plane, and means for constraining said wobble gear in floating engagement with both said eccentric gear and said output gear, whereby a sinuous output speed curve can be generated by said output gear for driving the film in the focal plane; means for exposing the film in the focal plane to the formed image; and means for synchronizing film movement with operation of said film exposure means at image motion compensation rate.

4. The invention according to claim 3 in which said synchronizing means includes an interlock device for preventing film exposure until film movement is synchronized with operation of said film exposure means.

5. The invention according to claim 3 in which said film exposure means is synchronized to operate at minimum film driving rate for an exposure.

6. The invention according to claim 5 wherein said film exposure means includes a shutter, and means for gradually cocking said shutter between exposures.

7. A camera incorporating image motion compensation, comprising: means for focusing an image on a focal plane; a substantially constant speed motor; a variable speed transmission, said transmission being driven by said motor and adjustable to provide a plurality of different output speeds corresponding respectively to correct image motion compensation rates for different image motion conditions; an eccentric gear adapted to be driven by the output of said transmission; a wobble gear engaging with said eccentric gear; an output gear; means for constraining said wobble gear in floating engagement with both said eccentric gear and said output gear, whereby a sinuous output speed curve can be generated by said output gear; a film drive roller adapted to be driven by said output gear for driving film in the focal plane in a cyclic, sinuously varying rate; means for exposing the film in the focal plane to the image; and means for synchronizing film movement with cyclic operation of said film exposure means at image motion compensation rate.

8. The invention according to claim 7 wherein said film exposure means includes a shutter having a spring mechanism for operating said shutter and a rotatable spring mechanism actuating arm for cocking said shutter, a cocking arm rotatably mounted on a pivot axle and adapted to engage the spring mechanism actuating arm to rotate the same against spring tension of the shutter operating spring mechanism and cock said shutter, means connecting with said cocking arm for oscillating the same on its pivot axle in a reciprocating movement, and latch means for engaging the spring mechanism actuating arm at the extreme of its movement produced by said cocking arm, whereby said shutter is cocked and operable when said cocking arm is returned to initial position, and said synchronizing means includes a trip device operatively actuated each cycle during film movement at image motion compensation rate to disengage said latch means and operate said shutter when said cocking arm is returned to its initial position.

9. In an aerial camera incorporating image motion compensation, means for focusing an image on a focal plane; film drive means for continuously driving film in the focal plane in a cyclic, sinuously varying rate; means for exposing the film in the focal plane to the image; and means for synchronizing film movement with cyclic operation of the film exposure means at image motion compensation rate, said synchronizing means including an interlock device comprising means for producing a signal each cycle during film movement at image motion compensation rate for operating said film exposure means, a trip switch connecting with said signal producing means, said trip switch being driven by said film drive means and operatively closed each cycle during film movement at image motion compensation rate, means for cocking said film exposure means when said film exposure means is uncocked, and switching means connecting said trip switch to said film exposure means, said switching means being operatively closed only when said film exposure means is fully cocked, whereby the signal produced by said signal producing means is applied during film movement at image motion compensation rate and when said film exposure means is fully cocked to operate the same for an exposure.

10. In an aerial camera incorporating image motion compensation, means for focusing an image on a focal plane; film drive means for continuously driving film in the focal plane in a cyclic, sinuously varying rate; means for exposing the film in the focal plane to the image, said film exposure means including a shutter having a spring mechanism for operating said shutter and a rotatable spring mechanism actuating arm for cocking said shutter, a cocking arm rotatably mounted on a pivot axle and adapted to engage the spring mechanism actuating arm to rotate the same against spring tension of the shutter operating spring mechanism and cock said shutter, means connecting with said cocking arm for oscillating the same on its pivot axle in a reciprocating movement, and latch means for engaging the spring mechanism actuating arm at the extreme of its movement produced by said cocking arm, whereby said shutter is cocked and operable when said cocking arm is returned to initial position; and means for synchronizing film movement with cyclic operation of said film exposure means at image motion compensation rate.

11. The invention according to claim 10 in which said synchronizing means includes an interlock device for preventing film exposure until film movement is synchronized with operation of said film exposure means and said cocking arm is returned to initial position.

12. The invention according to claim 10 including, in addition, means for adjusting the spring tension of the spring mechanism for operating said shutter, for varying shutter exposure speed.

13. The invention according to claim 10 wherein said means for oscillating said cocking arm includes a centrally pivoted lever arm having a slot on one side of the pivot point, a connecting rod having one end pin jointed to said cocking arm and the other end pin jointed to the other side of said lever arm, a crankdisc having a crankpin affixed to said crankdisc, the crankpin engaging with the slot in said lever arm, and means for rotating said crankdisc whereby said lever arm is oscillated on its pivot to reciprocate said connecting rod.

References Cited in the file of this patent

UNITED STATES PATENTS

| 622,451 | Depue | Apr. 4, 1899 |
| 1,817,182 | Fairchild | Aug. 4, 1931 |
| 2,096,755 | Parsberg | Oct. 26, 1937 |
| 2,342,509 | Gaty et al. | Feb. 22, 1944 |
| 2,424,989 | Koepfer | Aug. 5, 1947 |
| 2,474,323 | Rattray | June 28, 1949 |
| 2,713,814 | Sonne et al. | July 26, 1955 |
| 2,792,767 | Schmidt | May 21, 1957 |
| 2,796,009 | Doyle et al. | July 18, 1957 |

FOREIGN PATENTS

| 647,545 | Great Britain | Dec. 13, 1950 |